(12) United States Patent
Kim et al.

(10) Patent No.: US 9,399,695 B2
(45) Date of Patent: Jul. 26, 2016

(54) PRESSURE-SENSITIVE ADHESIVE COMPOSITIONS, POLARIZERS AND LIQUID CRYSTAL DISPLAYS COMPRISING THE SAME

(75) Inventors: No Ma Kim, Daejeon (KR); In Ho Hwang, Daejeon (KR); Jeong Min Ha, Daejeon (KR); Sung Soo Yoon, Daejeon (KR); Sung Su Kim, Chungcheongbuk-do (KR); Sang Jo Bae, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 32 days.

(21) Appl. No.: 12/812,229

(22) PCT Filed: Jan. 6, 2009

(86) PCT No.: PCT/KR2009/000049
§ 371 (c)(1),
(2), (4) Date: Oct. 1, 2010

(87) PCT Pub. No.: WO2009/088205
PCT Pub. Date: Jul. 16, 2009

(65) Prior Publication Data
US 2011/0007244 A1  Jan. 13, 2011

(30) Foreign Application Priority Data

Jan. 11, 2008 (KR) .................. 10-2008-0003590
Jun. 30, 2008 (KR) .................. 10-2008-0062527

(51) Int. Cl.
| G02F 1/1335 | (2006.01) |
|---|---|
| C09J 133/10 | (2006.01) |
| C08G 18/62 | (2006.01) |
| C08G 18/67 | (2006.01) |
| C09J 175/16 | (2006.01) |
| G02B 1/111 | (2015.01) |
| G02B 5/30 | (2006.01) |

(52) U.S. Cl.
CPC .......... *C08G 18/6229* (2013.01); *C08G 18/673* (2013.01); *C09J 175/16* (2013.01); *G02B 1/111* (2013.01); *B32B 2457/202* (2013.01); *C08G 2170/40* (2013.01); *G02B 5/3025* (2013.01); *G02F 1/133528* (2013.01); *G02F 2202/28* (2013.01); *Y10T 428/105* (2015.01); *Y10T 428/1036* (2015.01); *Y10T 428/1041* (2015.01); *Y10T 428/1059* (2015.01); *Y10T 428/1077* (2015.01); *Y10T 428/1082* (2015.01)

(58) Field of Classification Search
CPC .......... G02F 1/1335; G02F 1/133528; G02F 2202/28; G02B 5/30; G02B 5/3016; G02B 1/111; G02B 5/3025; C08L 33/04; C08L 33/06; C08L 33/08; C08L 33/10; C08L 33/12; C08J 3/28; C08J 3/24; C08J 3/246; C09J 7/02; C09J 7/0207; C09J 7/021; C09J 7/0217; C09J 7/0239; C09J 7/0246; C09J 133/06; C09J 133/08; C09J 133/10; C09J 133/12; C09J 175/16; C08G 18/6229; C08G 18/673; C08G 2170/40; B32B 2457/202; Y10T 428/105; Y10T 428/1059; Y10T 428/1077; Y10T 428/1036; Y10T 428/1041; Y10T 428/1082
USPC .................. 156/272.2, 275.7; 428/1.1, 343; 524/556
See application file for complete search history.

(56) References Cited

U.S. PATENT DOCUMENTS

| 4,686,166 | A | 8/1987 | Kumagai et al. | |
|---|---|---|---|---|
| 1,693,401 | A1 | 11/2005 | Kobayashi et al. | |
| 2002/0136890 | A1 | 9/2002 | Weiss et al. | |
| 2003/0054166 | A1 | 3/2003 | Chang et al. | |
| 2004/0127594 | A1* | 7/2004 | Yang et al. ................. | 522/114 |
| 2005/0244633 | A1* | 11/2005 | Kobayashi et al. ....... | 428/355 R |
| 2006/0162857 | A1* | 7/2006 | Nagamoto et al. ......... | 156/272.8 |
| 2006/0204749 | A1 | 9/2006 | Kita et al. | |
| 2007/0055006 | A1* | 3/2007 | Kim et al. ................. | 524/556 |
| 2007/0087133 | A1* | 4/2007 | Cho et al. ................. | 428/1.1 |
| 2007/0092733 | A1 | 4/2007 | Yang et al. | |
| 2007/0148485 | A1* | 6/2007 | Kusama et al. ............ | 428/520 |
| 2007/0166537 | A1 | 7/2007 | Nagamoto et al. | |
| 2007/0267133 | A1* | 11/2007 | Matano et al. ............. | 156/272.2 |
| 2008/0023132 | A1* | 1/2008 | Sano et al. ................. | 156/275.7 |
| 2011/0007244 | A1 | 1/2011 | Kim et al. | |

FOREIGN PATENT DOCUMENTS

| CN | 1693401 | 11/2005 |
|---|---|---|
| CN | 101074349 | 11/2007 |
| EP | 1591506 | 3/2010 |
| JP | 2005-206776 | 8/2005 |
| JP | 2005-206776 A | 8/2005 |
| JP | 2005-314579 | 11/2005 |
| JP | 2006-235568 | 9/2006 |
| JP | 2007-002111 A | 1/2007 |
| JP | 2007-161909 | 6/2007 |

(Continued)

*Primary Examiner* — Gwendolyn Blackwell
*Assistant Examiner* — Eli D Strah
(74) *Attorney, Agent, or Firm* — Dentons US LLP

(57) ABSTRACT

The present invention relates to pressure-sensitive adhesive compositions which contain (A) hydroxyl group and alkylene oxide group containing acrylic copolymer and (B) a multifunctional isocyanate-based hardener, and form interpenetrating network structures when hardened, and polarizers and liquid crystal displays comprising the same. The pressure-sensitive adhesive compositions of the present invention exhibit superior durability, reliability, and workability and effectively prevent light leakage under high temperature and/or high humidity conditions. Particularly, the present invention provides pressure-sensitive adhesive compositions capable of significantly suppressing light leakage even in large size display devices, and polarizers and liquid crystal displays comprising the same.

18 Claims, No Drawings

(56) References Cited

FOREIGN PATENT DOCUMENTS

| | | |
|---|---|---|
| JP | 2007-197659 | 8/2007 |
| JP | 2007-212995 | 8/2007 |
| JP | 2007-332341 | 12/2007 |
| JP | 5550079 B2 | 5/2014 |
| KR | 10-2002-0060272 A | 7/2002 |
| KR | 10-2007-0094066 A | 9/2007 |
| WO | WO 2006137559 A1 * 12/2006 ............ C09J 133/06 |

* cited by examiner

PRESSURE-SENSITIVE ADHESIVE COMPOSITIONS, POLARIZERS AND LIQUID CRYSTAL DISPLAYS COMPRISING THE SAME

This application is a 35 U.S.C. §371 National Stage entry of International Application No. PCT/KR2009/000049 filed Jan. 6, 2009, which claims priority to Korean Application No. 10-2008-0003590 filed Jan. 11, 2008 and Korean Application No. 10-2008-0062527 filed Jun. 30, 2008 all of which are hereby incorporated by reference for all purposes as if fully set forth herein in their entireties.

TECHNICAL FIELD

The present invention relates to a pressure-sensitive adhesive composition that is capable of suppressing light leakage phenomenon with having superior physical property under high temperature and/or high humidity conditions; a polarizer; and a liquid crystal display comprising the same.

BACKGROUND ART

The liquid crystal display is a device representing images by liquid crystals inserted between two sheets of thin glass substrates. In said device, when voltages are applied through electrodes connected to liquid crystals, the molecular alignment manner of liquid crystals changes, whereby transmission ratio of lights passing through the liquid crystals is changed, so that pictures or colors may be represented. Such a liquid crystal display has advantages that it uses very little power and can be flatly and thinly made. Therefore, it is a display device being in the limelight of various fields at present.

For preparing the liquid crystal display, liquid crystal cells comprising liquid crystals and glass substrates having transparent electrode, and polarizers are basically required and suitable adhesives or pressure-sensitive adhesives are also required for binding them.

The polarizer comprises an iodine compound or a dichroic polarizing material aligned in a certain direction, and has multi-layer structure comprising TAC (triacetyl cellulose) protective films for protecting polarizing elements, and the like. In addition, the polarizer may additionally comprise a phase difference film, or a compensation film for wide view angle such as a liquid crystal type film. Each film constituting these multi-layer polarizers is made of materials having different molecular structures and compositions, and so has different physical properties. Thus, under high temperature and/or high humidity conditions, it has inferior dimensional stability, since shrinkage or expansion behavior of the materials having a unidirectional molecular alignment is different. Therefore, if the polarizer is fixed by a pressure-sensitive adhesive, then stress is concentrated on the TAC layer by shrinkage or expansion under high temperature and/or high humidity conditions, thereby birefringence and light leakage phenomenon occur.

As a representative method for solving said problems, there is a method for giving stress relief property thereto by designing the pressure-sensitive adhesive to have high creep against external stress and to be easily modified. Specifically, it is a method for mixing high molecular weight polymer containing a functional group which may react with a cross-linking agent, with low molecular weight material including less or no cross-linkable functional group (KR Laid-open Patent Publication No. 1998-79266, and JP Laid-open Patent Publication Nos. 2002-47468 and 2003-49141).

However, the pressure-sensitive adhesive composition disclosed in said techniques has very poor tailoring property. Thus, on preparing polarizers, crooking or pressing phenomenon is arisen in the pressure-sensitive adhesive. So, there is a problem that yield is highly lowered.

As other technique for preventing light leakage phenomenon, there is a method for designing the pressure-sensitive adhesive to be very hard. When the pressure-sensitive adhesive has hard property, shrinking or expansion of the polarizer under high temperature and/or high humidity conditions is suppressed, whereby the resulting stress is minimized and focused on the outermost, so that relatively good optical properties may be realized.

However, in order to design the pressure-sensitive adhesive to be hard, bulk modulus of the adhesive should be much increased, and thereby endurance reliability is deteriorated, since adhesive property becomes lowered according to the increasing of the modulus.

Also, there are proposed methods, in which a photoinitiator and a multi-functional acrylate are added to a conventional single crosslinking structure, so as to improve bulk modulus, since the conventional single crosslinking structure cannot realize enough bulk modulus to maintain good light leakage-resistance property and endurance reliability (JP Laid-open Patent Publication Nos. 2007-197659 and 2007-212995).

In the above references, an acrylic copolymer containing a carboxyl group is used, and a multi-functional isocyanate is comprised as essential component to serve as a hardner for the copolymer, and improve cohesive property interface between a protective film (TAC) and a pressure-sensitive adhesive layer (JP Laid-open Patent Publication No. 2007-212995). However, in case of using only carboxyl group as functional group of an acrylic copolymer, since reaction speed of carboxyl group and isocyanate group is slow at ambient temperature, the pressure-sensitive adhesive property is over-increased and the re-workability is deteriorated.

Also, in case of mixing an acrylic copolymer containing hydroxy group and an acrylic copolymer containing carboxyl group in a certain ratio in order to increase the reactivity with isocyanate group, the problem of increasing the early-stage pressure-sensitive adhesive can be solved to some degrees (JP Laid-open Patent Publication No. 2007-197659). However, in that case, endurance reliability under high temperature is deteriorated, since curing reaction is excessively accelerated when being kept long time under high temperature. Additionally, in the pressure-sensitive adhesive disclosed in the references, according to increasing of the content of the multi-functional acrylate, a lot of haze is generated in a final product and the pressure-sensitive adhesive is excessively lowered, thereby endurance reliability under high temperature is deteriorated.

DISCLOSURE

Technical Problem

The present invention is accomplished considering the problems of the prior arts as described above, and is intended to provide a pressure-sensitive adhesive composition having excellent light leakage-preventing property, endurance reliability under high temperature and/or high humidity conditions and re-movablility, and especially representing superior light leakage-preventing property even in large sized display devices such as monitors having a size of 20 inches or more; a polarizer and a liquid crystal display using the same.

Technical Solution

As means to solve said object, the present invention provides a pressure-sensitive adhesive composition including interpenetrating polymer networks in a cured state, wherein the composition comprises (A) an acrylic copolymer containing a hydroxy group and an alkylene oxide unit, and (B) a multi-functional isocyanate hardener.

As another means to solve said object, the present invention provides a polarizer comprising a polarizing film or a polarizing device; and a pressure-sensitive adhesive layer which is formed on one or both sides of said polarizing film or polarizing device, and comprises a cured product of the pressure-sensitive adhesive composition according to the present invention.

As another means to solve said object, the present invention provides a liquid crystal display comprising a liquid crystal panel in which the polarizer according to the present invention is bonded to one or both sides of a liquid crystal cell.

Advantageous Effects

According to the present invention, the pressure-sensitive adhesive composition is provided, which can outstandingly suppress light leakage phenomenon with having superior endurance reliability under high temperature and/or high humidity conditions and maintaining excellent physical properties such as re-movability and workability. Especially, there is an advantage that the present pressure-sensitive adhesive composition represents superior light leakage-preventing property even in large sized display devices such as monitors having a size of 20 inches or more.

BEST MODE

The present invention relates to a pressure-sensitive adhesive composition, including interpenetrating polymer networks (hereinafter, it can be referred to as "IPN") in a cured state,
wherein the composition comprises (A) an acrylic copolymer containing a hydroxy group and an alkylene oxide unit; and (B) a multi-functional isocyanate hardener.

The present invention also relates to a polarizer comprising: a polarizing film, and a pressure-sensitive adhesive layer which is formed on one or both sides of said polarizing film and comprises a cured product of the pressure-sensitive adhesive composition according to the present invention.

The present invention also relates to a liquid crystal display comprising a liquid crystal panel in which the polarizer according to the present invention is bonded to one or both sides of a liquid crystal cell.

The present pressure-sensitive adhesive composition is described in more detail below.

In the present pressure-sensitive adhesive composition comprising the components as above, the gel content as represented in General Formula 1 below is preferably 80% to 99% and more preferably 90% to 99%.

$$\text{Gel Content (\%)} = B/A \times 100 \qquad \text{[General Formula 1]}$$

wherein A represents weight of a pressure-sensitive adhesive prepared from the composition of the present invention, and B represents dry weight of insoluble content after depositing the adhesive in ethyl acetate at ambient temperature for 48 hours.

If said gel content is less than 80%, it is apprehended that the endurance reliability under high temperature and/or high humidity conditions is lowered. If it is in excess of 99%, it is apprehended that the stress relief property of pressure-sensitive adhesive is lowered.

In the present invention, it is preferred that the (A) acrylic copolymer included in the present pressure-sensitive adhesive composition has a weight average molecular weight ($M_w$) of 1,000,000 or more. If the weight average molecular weight of said copolymer (A) is less than 1,000,000, it is apprehended that the endurance reliability of the composition is lowered, so that bubbles or peeling phenomenon may be occurred due to lowered cohesion under high temperature and/or high humidity conditions. As long as the weight average molecular weight of (A) copolymer used in the present invention is 1,000,000 or more, the upper limit is not particularly restricted. For example, the weight-average molecular weight can be controlled with a range of not more than 2,500,000. When said weight average molecular weight is in excess of 2,500,000, it is apprehended that the endurance reliability is deteriorated due to lowered adhesive property, or the coating property is lowered due to increased viscosity.

The specific composition of the (A) copolymer used in the present invention is not particularly restricted, as long as it contains a hydroxy group and an alkylene oxide unit, and has the weight average molecular weight as described above.

For example, the (A) copolymer may be used herein, which comprises i) (meth)acrylic acid ester monomer, ii) alkylene oxide adduct of (meth)acrylic acid, and ii) a monomer containing a hydroxy group.

In the above, any kind of (meth)acrylic acid ester monomer may be used, and for example alkyl (meth)acrylate may be used. In this case, when the alkyl group included in said monomer has excessively long chain, it is apprehended that cohesion of the pressure-sensitive adhesive is lowered and glass transition temperature ($T_g$) and adhesiveness are not easily controlled. Therefore, it is preferred to use (meth)acrylic acid ester monomer having an alkyl group with 2 to 14 carbon atoms. An example of such a monomer may include one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate. It is preferred that the (meth)acrylic acid ester monomer is comprised in an amount of 80 to 99.8 parts by weight, based on 100 parts by weight of the (A) copolymer. If said content is less than 80 parts by weight, it is apprehended that the initial adhesion strength of pressure-sensitive adhesive is lowered. If it is in excess of 99.8 parts by weight, it is apprehended that a problem is caused in durability due to lowered cohesion.

The (meth)acrylic acid alkylene oxide adduct gives alkylene oxide unit to the (A) acrylic copolymer. The alkylene oxide unit can reduce haze in a final product by increasing miscibility of the (A) copolymer and a multi-function acrylate as described below. Also, the alkylene oxide unit can make the pressure-sensitive adhesive have an excellent light leakage-preventing property by increasing bulk modulus when same amount of the multi-functional acrylate is used. Additionally, the alkylene oxide unit can improve durability, since it can make the adhesive to maintain good pressure-sensitive adhesive even in a state where the bulk modulus is much increased. Especially, the alkylene oxide shows an excellent miscibility with the acrylate having at least 3 functional group and comprising a cyclic structure in its skeleton.

An example of usable (meth)acrylic acid alkylene oxide adduct herein may include, but is not limited to, one or two or more species of alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, phenoxy alkyleneglycol (meth)acrylic acid ester, phenoxy dialkyleneglycol (meth)acrylic acid ester, phenoxy trialkyleneglycol (meth) acrylic acid ester and phenoxy tetraalkyleneglycol (meth) acrylic acid ester. In the above, the "alkoxy" may refer to an alkoxy having 1 to 8 carbon atom(s), and preferably methoxy, ethoxy, propoxy or butoxy. Also, the "alkylene glycol" may refer to an alkylene glycol having 1 to 8 carbon atom(s), and preferably ethylene glycol or propylene glycol.

The content of the (meth)acrylic acid alkylene oxide adduct is not specially limited, and it can be appropriately selected considering the above property. For example, the (meth)acrylic acid alkylene oxide adduct may be comprised in an amount of 2 to 40 parts by weight, based on 100 parts by weight of the (A) acrylic copolymer.

The monomer containing a hydroxy group included in the (A) copolymer serves to control endurance reliability under high temperature and/or high humidity conditions, adhesion strength and cohesion. An example of usable monomers containing a hydroxy group herein may include, but is not limited to, one or two or more species of hydroxyethyl (meth)acrylate, 2-hydroxypropyl (meth)acrylate, 4-hydroxybutyl (meth) acrylate, 6-hydroxyhexyl (meth)acrylate, 2-hydroxyethyleneglycol (meth)acrylate or 2-hydroxypropyleneglycol (meth)acrylate. It is preferred that the monomer containing a hydroxy group as above is contained in an amount of 0.1 to 5 parts by weight, and preferably 0.5 to 3 parts by weight, based on 100 parts by weight of the (A) copolymer. If said content is less than 0.1 parts by weight, it is apprehended the re-movability is deteriorated due to a increasing of the pressure-sensitive adhesive property. If it is in excess of 5 parts by weight, it is apprehended that endurance reliability and/or peel force is lowered, since the content of hydroxy group reacting with a cross-linking agent is excessively increased.

Also, in the (A) copolymer of the present invention, a monomer represented in Formula 1 below may be further copolymerized. Such a functional monomer may be added for controlling glass transition temperature of a pressure-sensitive adhesive and giving other functions thereto.

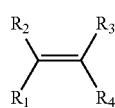

[Formula 1]

wherein $R_1$, $R_2$ and $R_3$ represents independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl; or glycidyloxy.

In the definitions of $R_1$ to $R_5$ of the above formula, alkyl or alkoxy means alkyl or alkoxy having 1 to 8 carbon atoms, and is, preferably, methyl, ethyl, methoxy, ethoxy, propoxy or butoxy.

The specific kind of monomer represented by the above Formula 1 may include, but is not limited to, one or two or more of nitrogen-containing monomers such as (meth)acrylonitrile, (meth)acrylamide, N-methyl (meth)acrylamide or N-butoxy methyl (meth)acrylamide; styrene monomer such as styrene or methyl styrene; glycidyl (meth)acrylate; or carbonic acid vinyl ester such as vinyl acetate, and the like. When the functional monomer as above is contained in the present acrylic copolymer, the content is, preferably, 20 parts by weight or less. If said content is in excess of 20 parts by weight, it is apprehended that flexibility and/or peel force of the pressure-sensitive adhesive is lowered.

The method for preparing the copolymer (A) is not particularly restricted. For example, it can be prepared through general methods such as solution polymerization, photo-polymerization, bulk polymerization, suspension polymerization, or emulsion polymerization. Especially, it is preferred to use solution polymerization. Preferably, such solution polymerization is carried out at a polymerization temperature of 50 to 140° C. by mixing an initiator in a state that each monomer is homogeneously mixed. At this time, as a usable initiator, a usual initiator, for example, an azo-based polymerization initiator such as azo-bisisobutyronitrile or azobiscyclohexanecarbonitrile; and/or a peroxide such as benzoyl peroxide or acetyl peroxide may be included.

The present pressure-sensitive adhesive composition also comprises (B) a multi-functional isocyanate hardener which may react with said copolymer (A). This hardener (B) reacts with the hydroxy group contained in the acrylic copolymer (A) as previously described and serves to form a crosslinking structure. Specific kind of this hardener (B) is not particularly limited, and may include, for example, one or more selected from the group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate and a reaction product of any one of the foregoing with polyol (ex. trimethylol propane). Preferably, this (B) hardener is contained in an amount of 0.01 to 5 parts by weight, relative to 100 parts by weight of the copolymer (A) as previously described. If said content is less than 0.01 parts by weight, it is apprehended that the cohesion of the pressure-sensitive adhesive is lowered, since the cross-linking reaction is not well performed. If it is in excess of 5 parts by weight, it is apprehended that the endurance reliability is lowered by causing interlayer peeling or loosing phenomenon, since the cross-linking reaction is excessively proceeded.

The pressure-sensitive adhesive composition of the present invention comprises the above components, and includes IPN in a cured state, and the term "cured state" used herein refers to a state in which the pressure-sensitive adhesive composition is prepared into a pressure-sensitive adhesive through a active-energy ray irradiation process, and the like. Also, the term "interpenetrating polymer networks" used herein refers to a state in which the pressure-sensitive adhesive comprises a crosslinking structure (hereinafter, it can be referred to as a "primary crosslinking structure") formed from reactions of the components (A) and (B), together with a crosslinking structure (hereinafter, it can be referred to as a "secondary crosslinking structure") formed from the other components.

In the present invention, the components forming the secondary crosslinking structure are not particularly limited, and examples thereof include a multi-functional acrylate and a photoinitiator as described below.

In the present invention, since the pressure-sensitive adhesive comprises the above specific components, the pressure-sensitive adhesive has an improved bulk modulus through the IPN structure, with suppressing haze, and without deterioration of re-movability, endurance reliability and pressure-sensitive adhesive property due to a increasing of the pressure-sensitive adhesive property.

The present pressure-sensitive adhesive composition may further comprise (C) a multi-functional acrylate. The (C) multi-functional acrylate serves to realize the secondary crosslinking structure through a reaction with (D) a photoinitiator as described below. Preferably, an acrylate having a molecular weight of less than 1,000 and containing three or more functional groups, is used as such (B) acrylate herein. An example of such (B) acrylate may include, but is not limited to, a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or isocyanate-modified urethane (meth)acrylate (ex. a reactant of trimethylolpropane tri(meth)acrylate with an isocyanate monomer).

Herein, one or a mixture of two or more of (C) multi-functional acrylates as above may be used. Especially, it is preferred to use an acrylate having cyclic structure in their skeleton. By using such an acrylate, the light leakage-preventing property can be further improved since it is possible to design the pressure-sensitive adhesive to be harder. At this time, the cyclic structure may comprise carbocyclic or heterocyclic structure; or monocyclic or polycyclic structure. An example of (C) acrylate comprising the cyclic structure may include a monomer having isocyanurate structure such as tris(meth)acryloxy ethyl isocyanurate; and a hexafunctional acrylate such as isocyanate-modified urethane (meth)acrylate (ex. a reactant of trimethylolpropane tri(meth)acrylate with an isocyanate monomer), but is not limited thereto.

In the pressure-sensitive adhesive composition, (C) multi-functional acrylate as above is, preferably, contained in an amount of 5 to 40 parts by weight, relative to 100 parts by weight of the (A) acrylic copolymer. If the content is less than 5 parts by weight, it is apprehended that light leakage-preventing property and/or durability under high temperature is deteriorated. If the content is in excess of 40 parts by weight, it is apprehended that durability under high temperature is deteriorated.

The present pressure-sensitive adhesive composition may further comprise (D) a photoinitiator. Said photoinitiator (D) may react with the multi-functional acrylate (C) as described above. Specific kind of photoinitiator (D) which may be used herein is not particularly restricted, and may include, for example, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], 2,4,6-trimethylbenzoyl-diphenyl-phosphineoxide, and the like. One or two or more of the forgoing may be used herein.

Preferably, the photoinitiator (D) as above may be contained in an amount of 0.01 to 10 parts by weight, relative to 100 parts by weight of said copolymer (A). More preferably, it may be contained in an amount of 0.2 to 20 parts by weight, relative to 100 parts by weight of said multi-functional acrylate (C). If the content of photoinitiator (D) is departed from said range, it is apprehended that the reaction of components (D) and (C) is not well performed, or the physical property of pressure-sensitive adhesive composition is degenerated due to the remaining components after reaction.

The present pressure-sensitive adhesive composition may also comprise a silane coupling agent in addition to the components as described above. Such a coupling agent improves adhesion and bonding stability between the pressure-sensitive adhesive and a glass substrate, whereby heat resistance and humidity resistance can be improved. Also, when the pressure-sensitive adhesive is left under high temperature and/or high humidity for a long time, the coupling agent serves to improve attachment reliability. Especially, it is preferred herein to use a silane coupling agent having an acetoacetate group or a β-cyanoacetyl group, which may react with the hydroxy group contained in the acrylic copolymer (A) as described above. An example of such a coupling agent may include γ-acetoacetate propyl trimethoxy silane, γ-acetoacetate propyl triethoxy silane, β-cyanoacetyl trimethoxy silane, β-cyanoacetyl triethoxy silane, and the like. One or two or more of the forgoing may be used alone or in a mixture thereof. Preferably, such a silane coupling agent is contained in an amount of 0.01 to 1 parts by weight in the composition, relative to 100 parts by weight of an acrylic copolymer (A). If said content is less than 0.01 parts by weight, it is apprehended that durability is deteriorated since the effect of increasing adhesion strength is slight. If it is in excess of 1 parts by weight, it is apprehended that the endurance reliability is lowered, so that bubbles or peeling phenomenon may be caused.

Also, from the viewpoint of controlling adhesion performance, the present pressure-sensitive adhesive composition may further comprise 1 to 100 parts by weight of a tackifier resin, relative to 100 parts by weight of the acrylic copolymer (A). Specific kind of such a tackifier resin is not particularly restricted, and may use one or two or more mixtures of a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin, and the like. If the content of said tackifier resin is less than 1 part by weight, it is apprehended that the effect caused by adding it is slight. If it is in excess of 100 parts by weight, it is apprehended that the effect of improving compatibility and/or cohesion is lowered.

Also, the present pressure-sensitive adhesive composition may further comprise one or more additives selected from the group consisting of an epoxy resin, a hardener, a UV stabilizer, an antioxidant, a colorant, a reinforcing agent, a filling agent, a defoaming agent, a surfactant and a plasticizer in a range of not affecting the effect of the present invention.

In addition, the present invention relates to a polarizer, comprising:

a polarizing film or a polarizing device; and a pressure-sensitive adhesive layer which is formed on one or both sides of said polarizing film or a polarizing device, and comprises a cured product of the pressure-sensitive adhesive composition, according to the present invention, as described above.

Specific kind of a polarizing film or polarizing device constituting said polarizer of the present invention is not particularly restricted. For example, a film obtained by containing a polarizing component such as iodine or dichroic dye into polyvinyl alcohol resin film, and elongating the resulting product may be used as said polarizing film. Said polyvinyl alcohol resin may comprise polyvinyl alcohol, polyvinyl formal, polyvinyl acetal and hydrolysate of ethylene-vinyl acetate copolymer, and the like. The thickness of said polarizing film is also not particularly restricted. It may be formed in a usual thickness.

The polarizer may be formed as a multilayer film, wherein protective films, such as a cellulose film, for example, triacetyl cellulose; a polyester film, for example a polycarbonate film or a polyethylene terephthalate; a polyether sulphone film; and/or a polyolefin film, for example, polyethylene film, polypropylene film, polyolefin film having cyclo or norbornene structure, or ethylene-propylene copolymer, are laminated on one or both sides of the polarizing film. At this time, the thickness of these protective films is also not particularly restricted. It may be formed in a usual thickness.

In addition, the present polarizer may further comprise one or more functional layers selected from the group consisting of protective layer, reflecting layer, anti-glare layer, phase difference plate, compensation film for wide view angle, and brightness enhancing film. At this time, specific kind of material, preparation method, thickness of the functional layers is not particularly limited, and conventional ones can be applied.

The method of forming the pressure-sensitive adhesive layer on the polarizing film or device as above is not particularly restricted, and may be used, for example, as a method of coating and hardening the pressure-sensitive adhesive composition on said polarizing film with Bar Coater and the like, or a method of coating and drying the pressure-sensitive adhesive on the surface of releasable substrate and then, transferring the pressure-sensitive adhesive layer to the surface of polarizing film.

It is preferred from the viewpoint of carrying out homogeneous coating that the (B) hardner is controlled for cross-linking reaction of functional groups to be not performed on forming pressure-sensitive adhesive layer. That is, said (B) hardner forms a cross-linking structure in drying and aging steps after coating to improve cohesion, whereby it may improve physical properties of pressure-sensitive adhesive articles such as adhesive property and cuttability.

In addition, on forming said pressure-sensitive adhesive layer, it is preferred to use the composition after sufficiently removing components causing bubbles such as volatile ingredients or reaction residues within the composition. If the cross-linking density or molecular weight is excessively low and thus elasticity modulus is lowered, it is apprehended that scatterers are formed inside by magnifying small bubbles present between the glass plate and the pressure-sensitive adhesive layer at high temperature conditions.

On preparing pressure-sensitive adhesive polarizers, the method of hardening the pressure-sensitive adhesive composition of the present invention is to use activating energy ray irradiation such as UV or electron ray. Among these, a hardening way using UV irradiation is more preferable. Such a UV irradiation may be obtained by using, for example, means such as a high pressure mercury lamp, an induction lamp or a xenon lamp.

The irradiation dose is not particularly restricted, as long as it is controlled in an extent of accomplishing sufficient hardening without damaging every physical property of the pressure-sensitive adhesive layer. For example, it is preferred that it has an illuminance of 50 mW/cm$^2$ to 1,000 mW/cm$^2$ and a light intensity of 50 mJ/cm$^2$ to 1,000 mJ/cm$^2$.

In addition, the present invention relates to a liquid crystal display comprising a liquid crystal panel, in which polarizer according to the present invention is bonded to one or both sides of a liquid crystal cell.

Specific kind of liquid crystal cell, constituting the liquid crystal display of the present invention as above, is not particularly restricted, and includes all general liquid crystal cells such as TN (Twisted Neumatic), STN (Super Twisted Neumatic), IPS (In Plane Switching) or VA (Vertical Alignment). Specific kind of other construction included in the liquid crystal display of the present invention and process for preparing the same is not particularly restricted, and general constructions in this field may be selected and used without limitation.

MODE FOR INVENTION

The present invention is explained in more detail through examples according to the present invention and comparative examples not according to the present invention below, but the scope of the present invention is not restricted to examples as described below.

Example 1

Preparation of Acrylic Copolymer

To 1 L reactor, which nitrogen gas was refluxed in and equipped with a cooling system for easy temperature control, was added a mixture of monomers consisting of 79 parts by weight of n-butyl acrylate (n-BA), 20 parts by weight of methoxy ethyleneglycol acrylate (MEA) and 1.0 part by weight of hydroxyl ethylacrylate (HEA). Then, 120 parts by weight of ethyl acetate (EAc) was added thereto as a solvent. To remove oxygen, nitrogen gas was purged for 60 minutes. Then, the temperature was kept at 60° C. and 0.03 parts by weight of azobisisobutyronitrile (AIBN) as a initiator was added thereto and reacted for 8 hours. After the reaction, the resulting product was diluted with ethyl acetate (EAc) to prepare an acrylic copolymer having a solid content of 15% by weight, a weight average molecular weight of 1,600,000, and a molecular weight distribution of 4.9.

Preparation of Pressure-Sensitive Adhesive Composition

Relative to 100 parts by weight of the acrylic copolymer as prepared above, 10 parts by weight of hexafunctional acrylate (isocyanate-modified urethane acrylate; a reaction product of isocyanate and pentaerythritol triacrylate), 1.0 parts by weight of XDI isocyanate hardener (D110N, manufactured by Mitsui Takeda, (JP)), 0.5 parts by weight of hydroxy cyclohexylphenyl ketone (manufactured by Ciba Specialty Chemicals (Swiss)) as a photoinitiator and 0.2 parts by weight of silane coupling agent containing a β-cyanoacetyl group (manufactured by LG Chemical Ltd.) were mixed and a concentration of solid content in the resulting coating liquid was controlled to 15%, to prepare a pressure-sensitive adhesive composition.

Preparation of Pressure-Sensitive Adhesive Polarizer

The pressure-sensitive adhesive composition as prepared above was coated on a polyethyleneterephthalate (PET) (MRF-38, manufactured by Mitsubishi Corporation) film that has been subjected to release treatment, and has a thickness of 38 μm to have a thickness of 25 μm after dryness, and said film was dried in an oven at 110° C. for 3 minutes. Then, the dried pressure-sensitive adhesive layer was stored at Temperature and Humidity Room Chamber (23° C., 55% RH) for about one day, and laminated on the WV coating layer of the polarizer that a WV (Wide View) liquid crystal layer was coated on one side. Then, the pressure-sensitive adhesive layer was treated with UV under the following conditions to prepare a pressure-sensitive adhesive polarizer.

UV irradiator: High pressure mercury lamp
Irradiation Conditions: Illuminance=600 mW/cm$^2$, Light Intensity=150 mJ/cm$^2$

Examples 2 to 8 and Comparative Examples 1 to 6

Preparation of Acrylic Copolymer

Acrylic copolymers were prepared by the same method as Example 1 above, except that on preparing the copolymers, raw materials as shown in Table 1 below were used (In Table 1, the acrylic copolymer A is the same as the copolymer prepared in Example 1).

TABLE 1

| | Copolymer | | | | | | | | |
|---|---|---|---|---|---|---|---|---|---|
| | A | B | C | D | E | F | G | H | I |
| n-BA | 79 | 94 | 79 | 79 | 94 | 98.7 | 99 | 99 | 95 |
| MEA | 20 | — | — | — | — | — | — | — | — |
| EEA | — | 5 | 20 | — | — | — | — | — | — |
| PEA | — | — | — | 25 | — | — | — | — | — |
| LA | — | — | — | — | 5 | — | — | — | — |
| 2-HEA | 1 | 1 | 1 | 1 | 1 | 1 | — | 1 | — |
| AA | — | — | — | — | — | 0.3 | 1 | — | 5 |
| AIBN | 0.05 | 0.05 | 0.05 | 0.05 | 0.05 | 0.05 | 0.05 | 0.05 | 0.05 |
| EAc | 120 | 120 | 120 | 120 | 120 | 120 | 120 | 120 | 120 |
| Mw (10,000) | 160 | 170 | 155 | 140 | 170 | 180 | 180 | 180 | 180 |
| Molecular Weight Distribution | 4.9 | 5.5 | 5.4 | 4.3 | 4.8 | 3.5 | 3.7 | 3.5 | 3.5 | n-BA: n-butylacrylate
MEA: methoxy ethyleneglycol acrylate
EEA: ethoxy diethyleneglycol acrylate
PEA: phenoxy ethyleneglycol acrylate
LA: lauryl acrylate
2-HEA: 2-hydroxyethyl acrylate
AA: acrylic acid
AIBN: azobisisobutyronitrile
EAc: ethyl acetate Preparation of Pressure-Sensitive Adhesive Composition Pressure-sensitive adhesive compositions were prepared by the same method as Example 1, except that components as shown in Table 2 and 3 below were mixed with the acrylic copolymers as prepared above.

TABLE 2

| | Example | | | | | | | |
|---|---|---|---|---|---|---|---|---|
| | 1 | 2 | 3 | 4 | 5 | 6 | 7 | 8 |
| Copolymer A | 100 | — | — | — | 100 | 100 | 100 | 100 |
| Copolymer B | — | 100 | — | — | — | — | — | — |
| Copolymer C | — | — | 100 | — | — | — | — | — |
| Copolymer D | — | — | — | 100 | — | — | — | — |
| Copolymer E | — | — | — | — | — | — | — | — |
| Copolymer F | — | — | — | — | — | — | — | — |
| Copolymer G | — | — | — | — | — | — | — | — |
| Copolymer H | — | — | — | — | — | — | — | — |
| Copolymer I | — | — | — | — | — | — | — | — |
| Multi-function A | 10 | 10 | 10 | 10 | — | 5 | — | — |
| Multi-function B | — | — | — | — | 10 | 10 | 10 | 20 |
| Multi-function C | — | — | — | — | — | — | — | — |
| Hardner | 1.0 | 1.0 | 1.0 | 1.0 | 1.0 | 1.0 | 1.0 | 1.0 |
| Irg184 | 0.3 | 0.3 | 0.3 | 0.3 | 0.3 | 0.3 | 0.3 | 0.3 |
| M812 | 0.2 | 0.2 | 0.2 | 0.2 | 0.2 | 0.2 | 0.2 | 0.2 |
| T-789J | — | 0.4 | — | — | — | — | — | — |
| KBM-403 | — | — | — | — | — | — | — | — |

Multi-function A: hexafunctional acrylate
Multi-function B: trifunctional acrylate(tris(meth)acryloxy ethyl isocyanurate)
Multi-function C: difunctional acrylate(tetraethyleneglycol diacrylate)
Hardner: XDI isocyanate(D110N)
Irg184: photoinitiator, hydroxy cyclohexylphenyl ketone(Ciba Specialty Chemicals (Swiss))
M812: silane coupling agent containing β-cyanoacetyl group (LG Chemical Ltd.)
T-789J: silane coupling agent containing acetoacetate group (Soken (JP))
KBM-403: epoxy silane coupling agent containing glycidyl group (Shin-Etsu (JP))

TABLE 3

| | Comparative Example | | | | | |
|---|---|---|---|---|---|---|
| | 1 | 2 | 3 | 4 | 5 | 6 |
| Copolymer A | — | — | — | — | — | 100 |
| Copolymer B | — | — | — | — | — | — |
| Copolymer C | — | — | — | — | — | — |
| Copolymer D | — | — | — | — | — | — |
| Copolymer E | 100 | — | — | — | — | — |
| Copolymer F | — | 100 | — | — | — | — |
| Copolymer G | — | — | 100 | — | — | — |
| Copolymer H | — | — | — | 100 | 100 | — |
| Copolymer I | — | — | — | — | 10 | — |
| Multi-function A | — | — | — | — | — | — |
| Multi-function B | 15 | 15 | 15 | 15 | 15 | — |
| Multi-function C | — | — | — | — | — | — |
| Hardner | 1.0 | 1.0 | 1.0 | 1.0 | 1.0 | 1.0 |
| Irg184 | 0.3 | 0.3 | 0.3 | 0.3 | 0.3 | — |
| M812 | — | — | — | — | — | 0.2 |
| T-789J | — | — | — | — | — | — |
| KBM-403 | 0.2 | 0.2 | 0.2 | 0.2 | 0.2 | — |

Multi-function A: hexafunctional acrylate
Multi-function B: trifunctional acrylate(tris(meth)acryloxy ethyl isocyanurate)
Multi-function C: difunctional acrylate(tetraethyleneglycol diacrylate)
Hardner: XDI isocyanate(D110N)
Irg184: photoinitiator, hydroxy cyclohexylphenyl ketone(Ciba Specialty Chemicals (Swiss))
M812: silane coupling agent containing β-cyanoacetyl group (LG Chemical Ltd.)
T-789J: silane coupling agent containing acetoacetate group (Soken (JP))
KBM-403: epoxy silane coupling agent containing glycidyl group (Shin-Etsu (JP))

Preparation of Pressure-Sensitive Adhesive Polarizer

Using each pressure-sensitive adhesive composition as above, pressure-sensitive adhesive polarizer was prepared by the same method as Example 1.

Using the polarizers prepared in Examples and Comparative Examples, gel fraction, adhesion strength, re-movability, endurance reliability, uniformity of light transmission (light leakage), haze and modulus were measured by methods as shown below.

1. Measurement of Gel Fraction

The pressure-sensitive adhesive layer prepared after irradiating UV was left in a constant temperature and humidity chamber (23° C., 60% RH) for about 7 days. Then, about 0.3 g of the pressure sensitive adhesive was poured into a stainless 200 mesh wire net and dipped into 100 ml of ethyl acetate. The resulting product was stored in a dark room at room temperature for 3 days. Then, the insoluble content was separated and dried in an oven at 70° C. for 4 hours. Then, its weight was measured and the gel fraction was measured using it.

2. Evaluation of Adhesion Strength and Re-Movability

The prepared polarizer was cut in a size of 25 mm×100 mm (width×length) to prepare a sample, and then adhered to an alkali-free glass using a laminator after removing the releasing sheet. Then, the resulting product was pressed in autoclave (50° C., 0.5 atmospheres) for about 20 minutes, and stored in the Temperature and Humidity Room Chamber (23° C., 50% RH) for 24 hours. Then, adhesion strength was measured under a condition in a detachment speed of 300 mm/min and a detachment angle of 180 degrees using Texture analyzer (Stable Micro Systems Ltd. (UK)), and evaluated re-movability through this measurement, based on the following basis.

○: after 1 day, adhesion strength being 800 or less
Δ: after 1 day, adhesion strength being 1,000 or more
×: after 1 day, adhesion strength being 2,000 or more 3. Evaluation of Endurance Reliability The prepared polarizer was cut in a size of 180 mm×250 mm (width×length) to prepare a sample, and said sample was attached to a panel on market by using laminator. Then, the resulting product was pressed in autoclave (50° C., 0.5 atmospheres) for about 20 minutes, and stored in the Temperature and Humidity Room Chamber (23° C., 50% RH) for 24 hours. Then, to evaluate moisture-heat resistance of the prepared specimens, they were left at a temperature of 60 and a relative humidity of 90% RH for 500 hours and then evaluated formation of bubbles or peeling. Also, in order to know their heat-resistance, they were left at 90 and 105 for 500 hours and then evaluated formation of bubbles or peeling. The evaluation was carried out after specimens were left at room temperature for 24 hours immediately before evaluating their states. The evaluation standard of humidity resistance and heat resistance was as follows.

○: No bubble and peeling phenomenon were observed.
: A few bubbles and/or peeling phenomenon were occurred.
×: Many bubbles and/or peeling phenomenon were occurred.

4. Light Transmission Uniformity

The evaluation of light transmission uniformity was carried out using the same specimen as that used for evaluating the endurance reliability. Specifically, it was observed whether or not light was leaked from each prepared specimen using back light in a dark room. As a method of testing light transmission uniformity, a polarizer with attached pressure-sensitive adhesive layer was attached to a 22 inch monitor (manufactured by LG Philips LCD), stored under constant temperature and humidity conditions for 1 day, left in an oven at 80° C. for 240 hours, and evaluated about light transmission uniformity of four side conferences in the monitor square. At this time, the evaluation of light transmission uniformity was carried out by calculating an increasing ratio of luminance relative to center part of the monitor after determining luminance value in upper and lower sides of the monitor, and right and left side of the monitor, at regular intervals relative to center part of the monitor by using spectroradiometer CS-2000 (KONICA MINOLTA (JP)). At this time, higher increasing ratio of luminance value is calculated, more light leakage is generated.

5. Haze

The pressure-sensitive adhesive layer (thickness: 23 micron) was prepared by irradiating a pressure-sensitive adhesive composition between releasing films (MRF-38, thickness: 38 micron, manufactured by Mitsubishi (JP)) with a UV. The haze of the prepared PSA layer was evaluated by using hazemeter (HR-100, manufactured by Murakami (JP)) according to JIS K 7105-1 standard.

6. Modulus of Pressure-Sensitive Adhesive

The pressure-sensitive adhesive was prepared by irradiating a pressure-sensitive adhesive composition between releasing films (MRF-38, thickness: 38 micron, manufactured by Mitsubishi (JP)) with a UV. Then pressure-sensitive adhesive layer having a thickness of about 25 μm was prepared by aging the prepared pressure-sensitive adhesive under constant temperature and humidity condition (23° C., 50% RH) for 7 days. Then the releasing film, on which pressure-sensitive adhesive layer was formed, was cut in a size of 6 cm×6 cm, and then the pressure-sensitive adhesive was uniformly rolled to prepare a pressure-sensitive adhesive bar. The pressure-sensitive adhesive bar was securely adhered to upper and lower chucks by rubber gasket in Texture analyzer (Stable Micro Systems Ltd. (UK)), and then gauge length was adjusted to be 2 cm. With applying force at a stretching speed of 120 mm/min, stress according to a length increase was determined. Young's modulus of pressure-sensitive adhesive was calculated by determining stress at a point that a length of pressure-sensitive adhesive bar was increased by 100%.

The results measured by the methods as above were arranged and described in Table 4 and 5 below.

TABLE 4

| | Example | | | | | | | |
|---|---|---|---|---|---|---|---|---|
| | 1 | 2 | 3 | 4 | 5 | 6 | 7 | 8 |
| Gel Content (%) | 94 | 95 | 95 | 94 | 95 | 97 | 98 | 98 |
| Adhesion Strength (gf/25 mm) | 250 | 200 | 270 | 300 | 350 | 230 | 500 | 200 |
| Re-movability | ○ | ○ | ○ | ○ | ○ | ○ | ○ | ○ |
| Heat Resistance Durability (90° C.) | ○ | ○ | ○ | ○ | ○ | ○ | ○ | ○ |
| Heat Resistance Durability (105° C.) | ○ | ○ | ○ | ○ | ○ | ○ | ○ | ○ |
| Heat Humidity Resistance Durability | ○ | ○ | ○ | ○ | ○ | ○ | ○ | ○ |
| Light Transmission Uniformity (%) (up and down) | 25 | 43 | 30 | 20 | 20 | 15 | 45 | 24 |
| Light Transmission Uniformity (%) (right and left) | 35 | 67 | 50 | 30 | 45 | 25 | 73 | 35 |

TABLE 4-continued

| | Example | | | | | | | |
|---|---|---|---|---|---|---|---|---|
| | 1 | 2 | 3 | 4 | 5 | 6 | 7 | 8 |
| Haze (%) | 7.2 | 8.3 | 7.2 | 6.5 | 7.6 | 7.7 | 7.6 | 7.2 |
| Modulus (MPa) | 1.45 | 1.2 | 1.6 | 1.4 | 1.5 | 1.8 | 1.0 | 2.0 |

TABLE 5

| | Comparative Example | | | | | |
|---|---|---|---|---|---|---|
| | 1 | 2 | 3 | 4 | 5 | 6 |
| Gel Content (%) | 94 | 97 | 98 | 93 | 95 | 82 |
| Adhesion Strength (gf/25 mm) | 120 | 140 | 98 | 100 | 170 | 80 |
| Re-movability | ○ | ○ | ○ | ○ | ○ | ○ |
| Heat Resistance Durability(90° C.) | ○ | Δ | Δ | ○ | Δ | Δ |
| Heat Resistance Durability(105° C.) | x | x | x | x | x | x |
| Heat Humidity Resistance Durability | Δ | Δ | Δ | x | Δ | x |
| Light Transmission Uniformity(%)(up and down) | 69 | 75 | 57 | 87 | 85 | 230 |
| Light Transmission Uniformity(%)(right and left) | 98 | 102 | 99 | 156 | 127 | 450 |
| Haze(%) | 10.9 | 9.8 | 7.5 | 9.9 | 10 | 5.3 |
| Modulus(MPa) | 0.4 | 0.3 | 2.0 | 0.5 | 0.4 | 0.08 |

As can be seen from the results of Table 4 above, in case of Examples 1 to 8, in which a copolymer containing a hydroxyl group and alkylene oxide unit was used, they showed an excellent light leakage-preventing property even when being applied to a large monitor with a size of 22 inches, with having superior endurance reliability, pressure-sensitive adhesive property, haze and modulus property.

However, as can be seen from the results of Table 5 above, in case of Comparative Examples 1 and 4, in which a copolymer only containing a hydroxyl group is used, a lot of light leakage phenomena were generated at upper and lower side, and right and left side of the monitor. Also, in that case, heat resistance durability, heat humidity resistance durability and haze property were very poor.

Also, in case that a copolymer containing a hydroxyl group and carboxyl group was used (Comparative Example 2), a copolymer containing carboxyl group was used (Comparative Example 3), and mixture of a copolymer containing carboxyl group and a copolymer containing a hydroxyl group was used (Comparative Example 5), they showed poor physical properties, and specially they showed much inferior heat resistance durability at 105° C.

Also, in case of Comparative Example 6, in which the pressure-sensitive adhesive comprised only single crosslinking structure, it was confirmed that pressure-sensitive adhesive properties, durability and light leakage-preventing properties were deteriorated.

The invention claimed is:

1. A pressure-sensitive adhesive polarizer, comprising: a polarizing film or a polarizing device; and
a pressure-sensitive adhesive layer to be attached on a liquid crystal panel, the pressure-sensitive adhesive layer being formed on one or both sides of the polarizing film or device, and comprising a cured pressure-sensitive adhesive composition,
wherein the pressure-sensitive adhesive composition includes an interpenetrating polymer network in a cured state,
wherein the pressure-sensitive adhesive composition comprises (A) an acrylic copolymer; (B) a multi-functional isocyanate hardener; (C) a multi-functional acrylate having a cyclic structure and (D) a photoinitiator, wherein an adhesion strength of the polarizer to alkali-free glass is 200 to 500 gf/25 mm, wherein the (A) acrylic copolymer comprises (meth)acrylic acid ester monomer; (meth)acrylic acid alkylene oxide adduct; and a monomer containing a hydroxy group, and
wherein the (meth)acrylic acid alkylene oxide adduct is included in an amount of 2 to 15 parts by weight, relative to 100 parts by weight of the (A) acrylic copolymer.

2. The pressure-sensitive adhesive polarizer according to claim 1,
wherein a gel content as represented by General Formula 1 is 80% to 99%:

$$\text{Gel Content (\%)} = B/A \times 100 \quad \text{General Formula 1}$$

wherein A represents weight of the pressure-sensitive adhesive layer, and B represents dry weight of insoluble content after depositing the pressure-sensitive adhesive layer in ethyl acetate at 23° C. for 48 hours.

3. The pressure-sensitive adhesive polarizer according to claim 1,
wherein the (A) acrylic copolymer has a weight average molecular weight of 1,000,000 or more.

4. The pressure-sensitive adhesive polarizer according to claim 1,
wherein the (meth)acrylic acid ester monomer is one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate.

5. The pressure-sensitive adhesive polarizer according to claim 1,
wherein the (meth)acrylic acid alkylene oxide adduct is one or more selected from the group consisting of alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, phenoxy alkyleneglycol (meth)acrylic acid ester, phenoxy dialkyleneglycol (meth)acrylic acid ester, phenoxy trialkyleneglycol (meth)acrylic acid ester and phenoxy tetraalkyleneglycol (meth)acrylic acid ester.

6. The pressure-sensitive adhesive polarizer according to claim 1,
wherein the monomer containing a hydroxyl group is one or more selected from the group consisting of hydroxyethyl (meth)acrylate, 2-hydroxypropyl (meth)acrylate, 4-hydroxybutyl (meth)acrylate, 6-hydroxyhexyl (meth)acrylate, 2-hydroxyethyleneglycol (meth)acrylate and 2-hydroxypropyleneglycol (meth)acrylate.

7. The pressure-sensitive adhesive polarizer according to claim 1,
wherein the (A) acrylic copolymer further comprises a monomer represented in Formula 1:

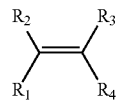

Formula 1 wherein $R_1$, $R_2$ and $R_3$ represents independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl; or glycidyloxy.

8. The pressure-sensitive adhesive polarizer according to claim 1,
wherein the (B) multi-functional isocyanate hardener is one or more selected from the group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate and a reactant of any one of the foregoing with polyol.

9. The pressure-sensitive adhesive polarizer according to claim 1,
wherein the pressure-sensitive adhesive composition comprises the (B) multi-functional isocyanate hardener in an amount of 0.01 to 5 parts by weight, relative to 100 parts by weight of the (A) acrylic copolymer.

10. The pressure-sensitive adhesive polarizer according to claim 1,
wherein the pressure-sensitive adhesive composition comprises 5 to 40 parts by weight of the (C) multi-functional acrylate, relative to 100 parts by weight of the (A) acrylic copolymer.

11. The pressure-sensitive adhesive polarizer according to claim 10,
wherein the pressure-sensitive adhesive composition comprises 0.01 to 20 parts by weight of the (D) photoinitiator, relative to 100 parts by weight of the (C) multi-functional acrylate.

12. The pressure-sensitive adhesive polarizer according to claim 1,
wherein the (C) multi-functional acrylate is one or more selected from the group consisting of trifunctional acrylate, tetrafunctional acrylate, pentafunctional acrylate and hexafunctional acrylate.

13. The pressure-sensitive adhesive polarizer according to claim 1,
wherein the (D) photoinitiator is one or more selected from the group consisting of benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenylketone, 2-methyl-1-[4-(methylthio)phenyl] -2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] and 2,4,6-trimethylbenzo yl-diphenylphosphineoxide.

14. The pressure-sensitive adhesive polarizer according to claim 1,
wherein the pressure-sensitive adhesive composition further comprises a silane coupling agent having an acetoacetate group or a β-cyanoacetyl group in an amount of 0.01 to 1 parts by weight, relative to 100 parts by weight of the (A) acrylic copolymer.

15. The pressure-sensitive adhesive polarizer according to claim 1,
wherein the pressure-sensitive adhesive composition further comprises a tackifier resin in an amount of 1 to 100 parts by weight, relative to 100 parts by weight of the (A) acrylic copolymer.

16. The pressure-sensitive adhesive polarizer according to claim 1, further comprising a protective film formed on one or both sides of the polarizing film or polarizing device, the protective film(s) being one or more selected from the group consisting of a film, a polyester film, a polyether sulphone film and a polyolefin film.

17. The pressure-sensitive adhesive polarizer according to claim 1, wherein an adhesion strength of the polarizer is 200 to 500 gf/25 mm and wherein the adhesion strength is measured under a condition in a detachment speed of 300 mm/min and a detachment angle of 180 degrees after adhering the polarizer in a size of 25 mm×100 mm (width×length) to an alkali-free glass using a laminator, pressing the resulted product in an autoclave (50° C., 0.5 atmospheres) for 20 minutes and then storing it in a Temperature and Humidity Room Chamber (23° C., 50% relative humidity, RH) for 24 hours.

18. A liquid crystal display comprising a liquid crystal panel in which the polarizer according to claim 1 is bonded to one or both sides of a liquid crystal cell.

* * * * *